(12) United States Patent  
Suzuki et al.

(10) Patent No.: US 6,580,186 B1  
(45) Date of Patent: Jun. 17, 2003

(54) BALANCE CORRECTING METHOD FOR A HIGH-SPEED ROTATABLE BODY, A DYNAMIC PRESSURE BEARING, AND AN OPTICAL SCANNING APPARATUS UTILIZING THE DYNAMIC PRESSURE BEARING

(75) Inventors: Mitsuo Suzuki, Yokohama (JP); Yukio Itami, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 09/633,867

(22) Filed: Aug. 7, 2000

(30) Foreign Application Priority Data

Aug. 6, 1999 (JP) ............................. 11-224585  
Oct. 29, 1999 (JP) ............................. 11-308144  
Jan. 11, 2000 (JP) ........................... 2000-002539

(51) Int. Cl.$^7$ ........................... H02K 5/24; F16H 33/00
(52) U.S. Cl. ..................... 310/51; 310/67 R; 74/573 R
(58) Field of Search .................... 310/51, 66, 67 R, 310/42, 90, 90.5; 74/572, 573 R, 574; 309/198, 199, 200

(56) References Cited

U.S. PATENT DOCUMENTS

| | | | |
|---|---|---|---|
| 4,726,640 A | 2/1988 | Iwama et al. ............... 350/618 |
| 5,069,515 A | 12/1991 | Itami et al. ................. 359/200 |
| 5,240,358 A | * 8/1993 | Hackett et al. ............. 409/141 |
| 5,289,067 A | * 2/1994 | Tanaka et al. ............. 310/90.5 |
| 5,453,650 A | 9/1995 | Hashimoto et al. ......... 310/268 |
| 5,508,477 A | 4/1996 | Kato et al. .................. 181/205 |
| 5,510,664 A | 4/1996 | Suzuki et al. ............... 310/268 |
| 5,574,591 A | * 11/1996 | Suzuki et al. .............. 359/200 |
| 5,606,448 A | 2/1997 | Suzuki et al. ............... 359/200 |
| 5,612,599 A | 3/1997 | Itami et al. ................. 318/254 |
| 5,726,699 A | 3/1998 | Itami et al. ................. 347/257 |
| 5,739,602 A | 4/1998 | Suzuki et al. ................. 310/51 |
| 5,769,544 A | 6/1998 | Suzuki et al. ............... 384/111 |
| 5,903,300 A | * 5/1999 | Suzuki ....................... 347/261 |
| 5,909,966 A | 6/1999 | Suzuki et al. ............... 384/115 |
| 5,969,844 A | 10/1999 | Itami et al. ................. 359/200 |
| 6,150,779 A | 11/2000 | Itami et al. ................. 318/254 |
| 6,215,974 B1 | 4/2001 | Katoh et al. ................. 399/258 |
| 6,242,826 B1 | * 6/2001 | Saito et al. .................. 310/267 |
| 6,252,841 B1 | * 6/2001 | Osawa et al. ............. 360/99.08 |
| 6,281,609 B1 | 8/2001 | Itami et al. ............... 320/68 B |
| 6,465,918 B1 | 10/2002 | Itami et al. ............... 310/68 B |

* cited by examiner

Primary Examiner—Dang Dinh Le  
(74) Attorney, Agent, or Firm—Oblon, Spivak, McClelland, Maier & Neustadt, P.C.

(57) ABSTRACT

A balance correcting method, a dynamic pressure bearing, and an optical scanning apparatus. For balance correction a method of attaching weight to the rotatable body and another method of partly removing the rotatable body are jointly used. At the time of a first balance correcting process step, a balance correction is performed by applying adhesive agent to a recess portion formed on a circular circumference of a polygon mirror or a recess portion constructed with a rotor flange. At the time of a second balance correcting process step, the polygon mirror is partly removed or the rotor flange is partly removed. The method can be applied to a dynamic pressure bearing capable of stabilizing a rotation balance and an optical scanning apparatus having a structure capable of not changing the direction of the reflection surface of the rotatable polygon mirror. The rotating shaft is supported in the radial direction by sucking air existing between the fixing shaft and the rotating shaft. In a dynamic pressure bearing, the rotating shaft is supported in a floating state from the above-mentioned fixing shaft.

6 Claims, 8 Drawing Sheets

FIG. 4

| | | CHECKED REVOLUTIONS NUMBER | | | | |
|---|---|---|---|---|---|---|
| | AMOUNT OF UNBALANCE | ~10,000rpm | ~20,000rpm | ~30,000rpm | ~40,000rpm | ~50,000rpm |
| FIRST PROCESS | Maximum 1,000mg·mm →20mg·mm | ◎ | × | × | × | × |
| SECOND PROCESS | 20mg·mm or less →2mg·mm or less | × | × | ○ | ○ | ◎ |

BALANCE CORRECTING METHOD FOR A HIGH-SPEED ROTATABLE BODY, A DYNAMIC PRESSURE BEARING, AND AN OPTICAL SCANNING APPARATUS UTILIZING THE DYNAMIC PRESSURE BEARING

BACKGROUND OF THE INVENTION

1. Field of the Invention

The present invention relates to a method of correcting the balance for a high-speed rotatable body, for instance, a method of correcting the balance for a rotatable body requiring high-speed rotation applied to an air bearing polygon scanner. The present invention further relates to a dynamic pressure bearing and an optical scanning apparatus using the dynamic pressure bearing.

2. Discussion of the Background

A balance correction method for correcting unbalance of a rotatable body has been well known hitherto. As to such methods for balance correction, the following methods (1), (2) described below are known.

(1) One balance correction method rotates the rotatable body and respectively detects the vibration occurring at the time of rotating the rotatable body and the standard position of the rotatable body, and additionally provides the weight on the desired position of the rotatable body in order to cancel the unbalanced mass causing the vibration.

(2) Another balance correction method removes a part of the rotatable body constructing part.

In recent years, in order to realize high-speed printing and high resolution of an image (high image quality) in a digital copying machine, etc., it has become necessary to rotate a polygon scanner with super-high speed more than 30,000 rpm and with high precision. However, when the rotatable body is rotated with high speed, the problem of vibration due to the unbalance of the rotatable body becomes serious, and therefore balance correction may become necessary in order to correct the unbalance of the rotatable body.

When a semiconductor laser (e.g., laser diode) is employed as the light source, an optical scanning apparatus in which the laser beam emitted from the light source is deflected and scanned by use of the rotating polygon mirror serving as the polarizing unit is used in the laser printer or the copying machine which is one type of image forming apparatus.

For the rotatable polygon mirror serving as the polarizing unit, a metal mirror having plural reflection surfaces formed by directly grinding aluminum is generally used. The metal mirror is rotatively driven by a motor for driving the mirror, and thereby the mirror can deflect the laser beam emitted from the light source in order to perform the scanning operation.

In recent years, as to the bearing structure for the driving motor, an air bearing structure referred to as a "dynamic bearing" has been employed.

Contrary to a ball bearing with a rotation speed equal to or lower than 10,000 rpm, the dynamic pressure bearing rotates with a high rotation speed (revolutions number) equal to or higher than 30,000 rpm. At the time of the rotation, the dynamic pressure bearing takes the surrounding air thereinto and supports the rotor in the radial direction in a floating state, and further the bearing causes the rotor to rotate without being brought into contact with the surrounding portions in the floating state of the rotor therefrom in the up-and-down direction by utilizing the magnetic force of the magnet. In the structure of such a dynamic pressure bearing, the rotor is not brought into mechanical contact with the surrounding portion. Furthermore, the structure does not need to pour any lubricating agent (e.g., oil), and thereby a maintenance-free bearing can be realized.

As to the structure of a dynamic pressure bearing employed for a rotatable polygon mirror, the published specifications of Japanese Laid-open Patent Publication No. 6-110007, Japanese No. 2707453, and Japanese Laid-open Patent Publication No. 7-190047 respectively disclose structures of dynamic pressure bearings.

The published specification of the Japanese Laid-open Patent Publication No. 6-110007 discloses a unitary integrated structure of a rotatable shaft fitted to the fixed shaft provided in the main body of the machine as a rotatable body, a pedestal mounted on the outer circumference of the rotatable shaft, a polygon mirror and magnet respectively fitted and firmly combined, and such that the pedestal is brought into direct contact with the lower surface of the rotatable polygon mirror. Thereby, the horizontality rate of the rotating surface is kept and is constructed with aluminum employed as a light and low-inertia substance, and the pedestal and the rotatable polygon mirror are bonded to the rotatable shaft.

The published specification of Japanese Patent No. 2707453 discloses another structure in which plural rotatable polygon mirrors for deflecting the laser beam are prepared and when the diameter of the connecting portion for connecting respective polygon mirrors in the axis direction thereof is larger than the diameter of a spring washer for holding the polygon mirrors by pushing them down from above, and the polygon mirrors are respectively concentric with an inscribed circle of the rotatable polygon mirrors, the connecting portion is formed such that the diameter of the portion is smaller than that of the inscribed circle, and the rotatable polygon mirror can be prevented from being distorted or deformed due to the pressure at the time of pressing the mirrors by use of the spring washer.

The published specification of Japanese Laid-open Patent Publication No. 7-190047 discloses still another structure in which, for a high-speed rotatable body provided with an outer circumferential member made by a firmly attached (e.g., bonded) metal, by a shrinkage fitting method to a ceramics sleeve and an outer circumference thereof, the inner side (or wall) of the ceramic sleeve is formed in the shape of a drum after firmly attaching (e.g., bonding) the ceramics sleeve to the metal outer circumferential member utilizing the above-mentioned shrinkage fitting method. The inner side of the ceramics sleeve is formed in the predetermined drum shape such that the gap is formed between the outer circumferential surface of the fixed shaft made of ceramics and the inner circumferential surface of the ceramics sleeve to be tightly fittedly inserted thereinto, in accordance with the shrinkage fitting compression stress eased by the thermal expansion due to the centrifugal force and the frictional force at the time of the high-speed rotation, and the drum shape is made equal to the compression deformation corresponding to the shrinkage fitting compression stress caused by the temperature rising-up at the time of using the bearing. Thereby, the initial gap of the bearing can be kept uniform.

SUMMARY OF THE INVENTION

Heretofore, the background arts regarding a balance correcting method for a high-speed rotatable body, a dynamic pressure bearing, and an optical scanning apparatus utilizing the dynamic pressure bearing have been described. However, according to such background arts, for instance as disclosed in the noted background-art documents, e.g., the documents describing the balance correcting method, and the published specifications of Japanese Laid-open Patent Publication Nos. 6-110007 and 7-190047 and Japanese Patent No. 2707453, etc., there is not provided any advantageous functional effects for improving the balance correcting method, the dynamic pressure bearing, and the optical scanning apparatus.

The present invention has been made in view of the above-discussed and other problems and one object of the present invention is to address the above-mentioned defects and troublesome matters of the background arts.

In more detail, since the greater the revolutions number at the time of correcting balance, the more improved the vibration detecting ability, the rotatable body is desired to be rotated with high speed. However, a method of adding weight causes a troublesome matter for the balance correction due to the high-speed revolutions, because the weight is scattered by the action of centrifugal force.

Furthermore, in a method of removing a part of the rotatable body constructing parts, the above-mentioned troublesome matters do not occur at all. However, immediately after assembling the rotatable body before correcting the balance, an unbalance due to unevenness of the respective construction parts turns out to be large. On such a condition, when the rotatable body is rotated with high speed, the amplitude of the vibration becomes very large. As the result, the bearing may be considerably damaged. To state more concretely, when a rolling bearing such as a ball bearing, etc. is employed, the ball surface and the inner and outer rings may be damaged. When a fluid bearing such as a dynamic pressure bearing, etc. is employed, since the load capacitance thereof is small, the bearing may be brought into contact with other parts. As the result, the bearing may also be damaged.

The above problems can be reduced by decreasing the initial unbalance. However, in a case that the revolutions number is equal to or larger than 30,000 rpm, the accuracy of the mechanical processing for the fitting portions of the respective construction parts has to be on the order of not larger than several $\mu$m, on all occasions. Consequently, the cost of assembling the parts of the bearing may increase, and further temperature control may be necessary at the time of assembling the bearing. As a result, there arise many other problems to be solved.

To address the drawbacks in the background art noted above, according to the present invention, a method of attaching a weight onto a desired position of the rotatable body and another method of removing a part of the rotatable body constructing parts, both in the process of correcting the balance, are jointly utilized. Thereby, the accuracy of correcting the balance can be improved, and thereby a polygon scanner with a the low vibration can be provided.

Next, subject matter to be solved regarding the dynamic pressure bearing and the optical scanning apparatus using the dynamic pressure bearing is discussed.

In the structure of the dynamic pressure bearing employed in the rotatable polygon mirror, as disclosed in the published specification of the Japanese Laid-open Patent Publication No. 7-190047, the temperature of the construction member rises due to thermal friction between the rotatable body side and air occurring at a time of the rotation. For this reason, when there exists a difference in the thermal expansion amount between the structural members, a looseness occurs in the junction parts thereof and the balance of the rotatable body is deteriorated.

Regarding the above-mentioned matters, the published specification of Japanese Laid-open Patent Publication No. 7-190047 discloses mitigation of the shrinkage fit compression stress caused by the thermal expansion. The unevenness of the gap formed between the outer circumferential surface of the fixed shaft made by ceramics and the inner circumferential surface of the ceramics sleeve fittedly inserted into each other is prevented as a result of the shape of the inner surface of the ceramics sleeve. None of the other published specifications disclose the above-mentioned points. In particular, in the published specifications of Japanese Laid-open Patent Publication No. 6-110007 and Japanese Patent No. 2707453, there is disclosed a low-inertia structure or a structure only aiming at decreasing the thickness of the rotatable polygon mirror, with the intention of reducing the load of the driving source at the time of starting the rotation.

If there is a difference between the thermal expansion amounts of the respective structural members at the connecting portions thereof, the connecting relationship between the rotatable polygon mirror as one of the rotatable bodies and the sleeve fittedly fixed on the outer circumferential surface of the polygon mirror deviates from the normal state. As a result, a surface falling-down may occur on the reflection surface of the rotatable polygon mirror, or the position of the rotational gravity center may change at the time of rotation, and thereby the balance condition worsens. Consequently, the above matters are a cause of vibration.

Regarding the vibration at the time of rotation, the published specification of Japanese Patent No. 2707453 discloses provision of a weight mounting portion for taking a moving balance on an upper surface of a connecting portion. However, such a structure is only employed when the rotatable polygon mirror is mounted on the rotatable shaft. The structure is not one in which the bearing on the rotatable shaft is made in the dynamic bearing structure. Namely, the above background-art document does not disclose any thing aiming at improvement of the thermal expansion on the dynamic pressure bearing.

On the other hand, with respect to the respective published specifications regarding the thermal expansion, for instance, the Japanese Laid-open Patent Publication No. 6-110007 discloses a structure in which parts around the rotatable body are fixed thereon with adhesive agent or are pressingly fixed thereon by use of a plate spring. In such a structure, the thermal stress is apt to occur very frequently due to the temperature rising-up at the adhesive agent portion or the plate spring and the centrifugal force caused by the rotation. Consequently, the rotation balance may become unstable.

In the structure of Japanese Patent No. 2707453, the connecting portion and the rotatable polygon mirror are pressingly fixed to each other by a plate spring, and thereby when the thermal stress occurs the pressing fixture relationship deviates from the normal state and the rotation balance may become unbalanced.

In the structure disclosed in Japanese Laid-open Patent Publication No. 7-190047, as mentioned above, the rotation balance is corrected to some extent. However, since the thermal expansion of the outer circumferential member made by the metal is larger than that of the ceramics sleeve and the ceramics sleeve is firmly fixed directly to the metal-made outer circumferential member, and even though a drum-shaped member having the circumferential surface without any ceramics sleeve is provided with a shape changing deformation corresponding to the thermal stress, the occurrences of a thermal expansion difference between both of the above members cannot be avoided. Consequently, it is impossible to prevent changing of the reflection surface of the rotatable polygon mirror.

The present invention solves the subject matters mentioned heretofore and provides an improved balance correcting method for a high-speed rotatable body, such as an improved dynamic pressure bearing, and an improved optical scanning apparatus by utilizing the above-mentioned dynamic pressure bearing.

An object of the present invention is to provide a novel method of attaching a weight onto a desired position of a rotatable body and of removing a part of the rotatable body constructing parts, both jointly utilized in a process for correcting balance. In such a method as mentioned above, the accuracy of correcting the balance can be improved, and thereby a polygon scanner of low vibration can be provided.

Another object of the present invention is, in consideration of the subject matters to be solved regarding the above-mentioned background-art dynamic pressure bearing and an optical scanning apparatus utilizing the above dynamic pressure bearing, to provide a novel dynamic pressure bearing capable of stabilizing rotation balance and an optical scanning apparatus provided with a structure capable of not changing a direction of a reflection surface of a rotatable polygon mirror.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings; wherein:

FIG. 4 is an explanatory diagram explaining a relationship between first and second processes, and an amount of unbalance and check revolutions number;

DETAILED DESCRIPTION OF THE PREFERRED EMBODIMENTS

Figure 1:
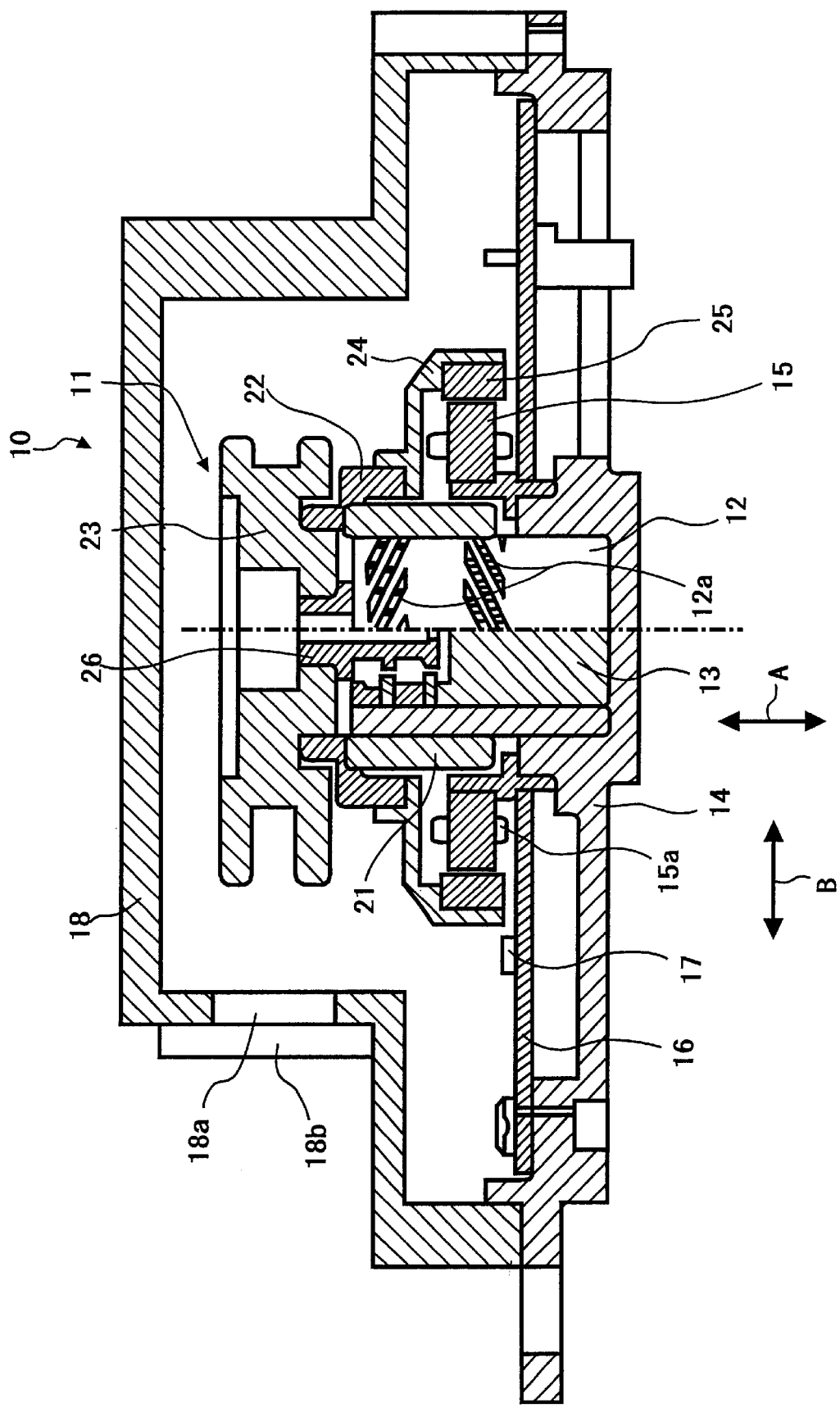
FIG. 1 is a structural cross-sectional view illustrating an entire structure of an embodiment of a dynamic pressure air bearing type polygon scanner utilizing a balance correcting method according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several figures, i.e. FIGS. 1 through 8, there are illustrated a balance correcting method for a high-speed rotatable body, a dynamic pressure bearing, and an optical scanning apparatus utilizing the dynamic pressure bearing of the present invention.

To state more concretely, an embodiment of the balance correcting method for the high-speed rotatable body according to the present invention is described, referring to FIGS. 1 through 4, and another embodiment of the dynamic pressure bearing and the optical scanning apparatus utilizing the above dynamic pressure bearing and the modification thereof according to the present invention are described, referring to FIGS. 5 through 8.

The preferred embodiments of the present invention are concretely described in detail, hereinafter, referring to the accompanying drawings. However, the present invention is not always limited to the described contents. It includes a wider scope than that of the description.

An embodiment of the balance correcting method for a high-speed rotatable body according to the present invention is described hereinafter, referring to the accompanying drawings. FIGS. 1 through 4 illustrate an embodiment regarding a dynamic pressure air bearing type polygon scanner applying a balance correcting method of the present invention.

In FIG. 1, the dynamic pressure air balance type polygon scanner 10 (hereinafter, simply referred to as a "polygon scanner") is constructed with a rotatable body 11, a fixed shaft 12, a spacer member 13, a housing 14, a stator 16, a Hall element 17, and an upper cover 18.

The upper cover 18 is formed so as to cover the rotatable body 11. The upper cover 18 and the circuit base board 16 tightly seal the rotatable body 11. The upper cover 18 further includes an opening window portion 18a for receiving and emitting the laser beam. A glass member 18b is fixed to the opening window portion 18a so as to closely attach thereto. Namely, the upper cover 18 constructs a cover member.

In the rotatable body 11, the inner circumferential portion of a flange 22 (for instance made of aluminum alloy) is fixed to the upper-edge outer circumferential portion of the cylinder-shaped rotatable sleeve 21 (for instance made of ceramics) utilizing a shrinkage fitting method or an ordinary fitting method. A polygon mirror 23 is firmly fixed to the upper part of the flange 22, and a rotor magnet assembly composed of a rotor flange 24 and a rotor magnet 25 is firmly fixed to the lower part thereof. Furthermore, a magnetic body 26 constructing a magnetic bearing for supporting an axial direction (in FIG. 1 the direction shown by the arrow A) in the non-contact state is firmly fixed to the center portion of the polygon mirror 23.

A herringbone state dynamic pressure generating groove 12a is formed on the outer-diameter of the fixed shaft 12 forming the dynamic pressure bearing in the radial direction (in FIG. 1 the direction shown by the arrow B). The lower-edge outer circumferential portion of the fixed shaft 12 may be fixed to the housing 14 utilizing a shrinkage fitting method or an ordinary fitting method.

The rotatable sleeve 21 and the fixed shaft 12 are formed in the shape of a cylinder and are made of, for instance, a ceramics material. The polygon mirror 23 fixed to the upper-edge outer diameter portion of the rotatable sleeve 21 is constructed with, for instance, aluminum alloy material.

Figure 2:
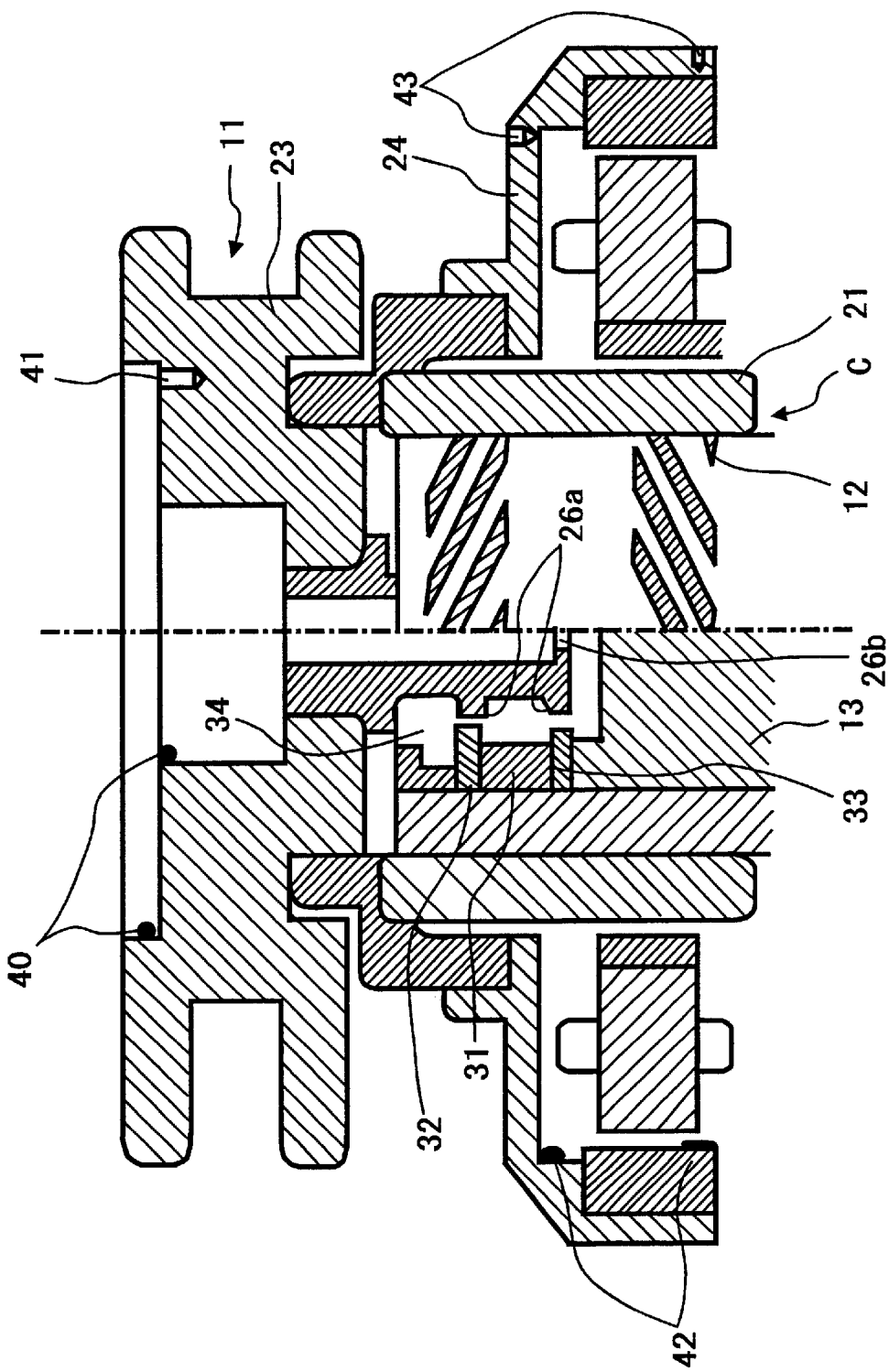
FIG. 2 is an enlarged view illustrating a main part of the rotatable body shown in FIG. 1.

FIG. 2 is an enlarged view illustrating the main body of the rotatable body 11 in which the same reference numeral are attached to the same elements as in FIG. 1.

The dynamic pressure bearing gap (in FIG. 2 element C) constructed with the fixed shaft 12 and the inner circumferential surface of the rotatable sleeve 21 is tightly fitted on the order of several μm. A permanent magnet assembly (magnet 31 and upper and lower magnetic plates 32 and 33, hereinafter referred to as a "magnetic bearing") for use in the magnetic bearing for constructing the axial bearing is disposed on the inner circumferential portion of the fixed shaft 12.

The magnetic bearing has a projecting portion 26a of the magnetic body 26 and a magnetic gap in the radial direction, and the bearing is supported in a non-contact state in the axial direction, utilizing the absorbing force exerted between the gaps.

Furthermore, a very fine hole 26b for communicating with the upper air accumulating portion 34 formed by the fixed shaft 12 and the rotatable body 11 and the exterior portion of the rotatable body 11 is formed in the magnetic body 26. In such a structure, the magnetic bearing has a dumping characteristic.

The spacer member 13 is disposed in the lower part of the magnetic bearing in order to determine the position of the magnetic bearing in the axial direction thereof and to reduce the volume of the air accumulating portion 34. The smaller the volume of the air accumulating portion 34, the more improved the rigidity of the air spring. The spacer member 13 is projected through the center portion of the housing 14 and fixed thereon.

The motor system of the polygon scanner 10 is a system referred to as "an outer-rotor type system" having a magnet 25 and a magnetic gap in the outer diameter direction of the stator 15. In the system, the signal output from the Hall element 17 mounted on the circuit base board 16 is referred to as the position signal by the action of the magnetic field of the rotor magnet 25. The magnetic excitation of the stator winding 15a is changed over by the drive circuit, and thereby the rotatable body 11 is rotated.

In FIG. 2, the reference numerals 40–43 represent a correcting part such as an adhesive agent or a drilling hole both utilized at the time of the later-mentioned balance correction.

The rotatable body 11 performs balance correction, by a so-called two surface correction, with the up-and-down movement of the rotatable body 11 in order to decrease the vibration at the time of the high-speed rotation. The balance is respectively corrected by the polygon mirror 23 at the upper side and by the rotor flange 24 at the lower side.

Figure 3:
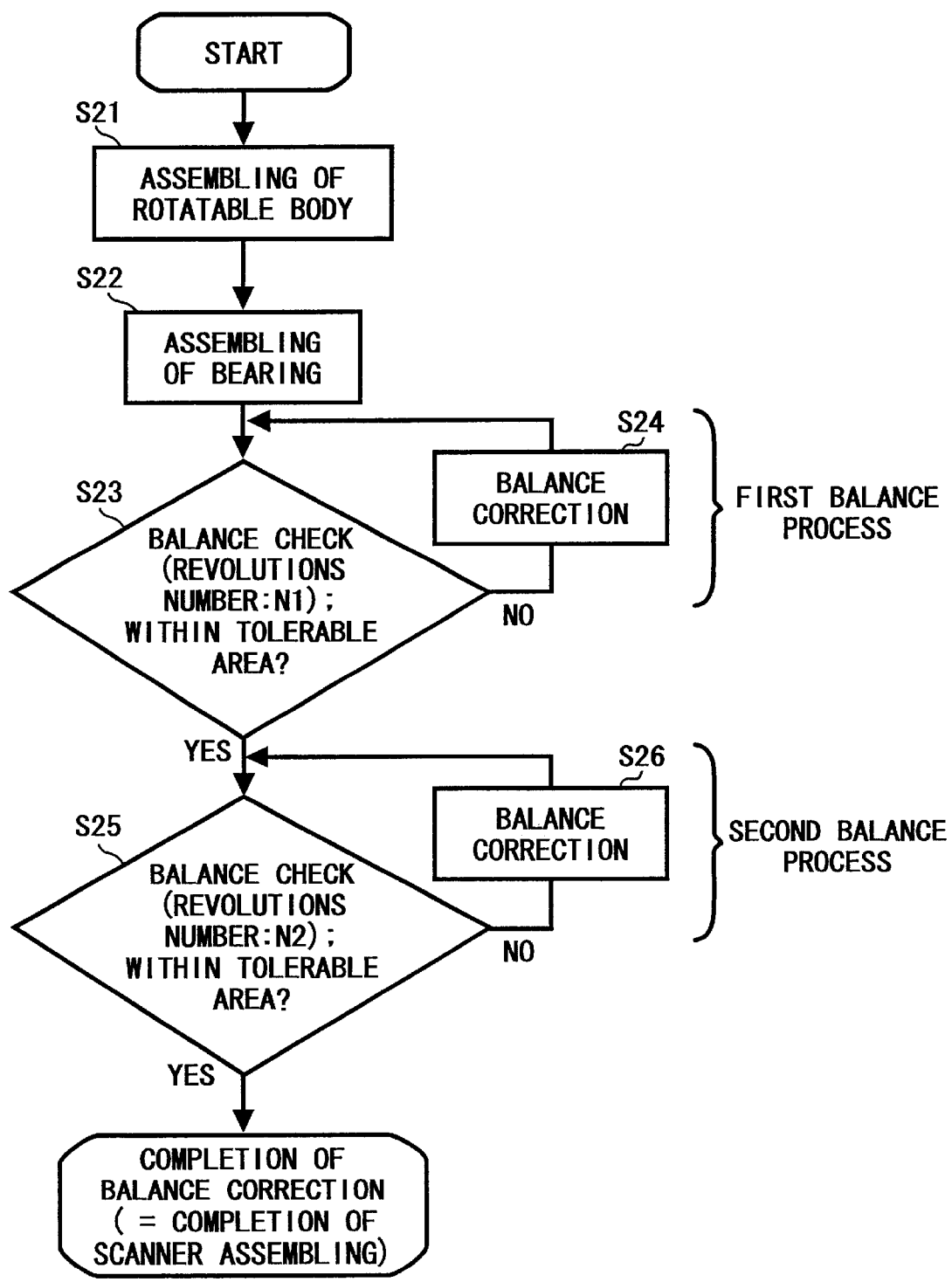
FIG. 3 is a flow chart explaining a method of correcting balance in the polygon scanner according to the present invention.

Regarding the balance correction, the points to be corrected are shown in FIG. 2, and the process of the balance correction is shown in FIG. 3. The details thereof are respectively explained in FIGS. 2 and 3.

As shown in FIG. 2, regarding the upper-side correction, the adhesive agent 40 is applied into the recess portion on the circular circumference formed on the polygon mirror 23 at the time of the first balance correcting process step 24, and the upper part of the polygon mirror 23 is partly removed by drilling with a drilling tool in order to form the drilling hole 41 at the time of the second balance correcting process step 26.

Furthermore, regarding the lower-side correction, the adhesive agent 42 is applied into the recess portion constructed with the rotor flange 24 (or the rotor magnet 25) at the time of the first balance correcting process step 24, and the rotor balance 24 is partly removed by drilling with a drilling tool in order to form the drilling hole 43 at the time of the second balance correcting process step 26.

At first, the rotatable body 11 (the reference numerals 21–26 in FIG. 1) is assembled (S21 of FIG. 3). The rotatable body 11 thus assembled is fittedly combined with the fixing-side unit of an assembled part constructed with, at least, fixing shaft 12, magnetic bearings 31–33, and an assembly of motor sections 15–17—parts required at the minimum in order to rotate the rotatable body 11 at the time of correcting the balance (S22).

Thereafter, the process enters the first balance correcting process. At first, the motor is rotated with a constant revolutions number N1 in order to check the unbalance state, and the balance is checked (S23). At this time, a rotational driving operation is performed by the motor section itself and the constant speed rotation control operation is executed.

Such an operation is simple, because there is no need to use the rotation control apparatus in another way. Furthermore, since the constant rotation speed employed for the polygon scanner 10 is used as it is, the unevenness of the rotation speed is very small, and thereby the vibration check can be done with high accuracy. If the unevenness of the rotation speed is large, the vibration value varies in accordance with the rotation unevenness frequency, and therefore there exists a limitation in the checking operation with high accuracy. As the result, the balance correction with high precision may turn out to be difficult.

Furthermore, as to the rotation control method, there are some methods such as a PLL (Phase Locked Loop) control method or a velocity disc laminator method, etc., and a PLL control method in a wide range of constant speed control.

Furthermore, the rotation drive is performed at an attitude at a time of deflecting the laser light by use of the polygon scanner 10 in an actual usage. For instance, when the rotation shaft direction in which the copying machine is installed is horizontal (90° inclined), the rotating operation at the time of correcting the balance is done in the state of inclining by 90°.

In such a way, the attitude is made the same as that in an actual usage state, and thereby the influence to the balance due to the variation of the bearing rigidity can be eliminated, in particular. As a result, the balance correction can be done with high accuracy.

The rotatable body 11 immediately after assembling is in a largely unbalanced (initial unbalance) state due to the influence of the accuracy of the parts simple structure shape and the assembling play (backlash). The maximum unbalance may be 1,000 mg•mm. In such a state, high-speed rotation may damage the bearing. In particular, since the bearing load capacitance of the dynamic pressure bearing is smaller than that of the ball bearing, when the unbalance state of 1,000 mg•mm occurs at 10,000 rpm or more, the bearing may turn out to be fatally damaged (for instance, by burning out or by baking).

When the result of the balance check is not within the tolerable area equal to or less than 20 mg•mm, the adhesive agents 40 and 42 having a specific gravity heavier than that of the aluminum alloy are applied to the rotatable body in order to correct the balance (S24).

According to this method, metal powder, etc. is mixed in the adhesive agent. As a result, the specific gravity thereof can be made large. Such a method may be preferable as the balance correcting method in the first balance process.

Furthermore, as to the removing method (scraping-off method), since the aluminum alloy is a light material (2.7 g/cm$^3$), in order to perform the balance correction in the range of 1,000 mg•mm to 20 mg•mm or less, which is the level of not damaging the bearing at the time of the high-speed rotation, the volume to be removed becomes inevitably large, and thereby the working time is elongated, the recess portion becomes large, and the wind loss also becomes large. The above matters are troublesome. In order to eliminate the above-mentioned matters, one method is to provide a member having a heavy specific gravity (e.g., iron, etc.). However, according to this method, the number of the parts increases, the mass of the entire apparatus also increases, and the initiating time has to be extended, because of the large inertia. As mentioned heretofore, there arise many problems to be solved.

Thereby, in the first balancing process of the present invention, either one of a lower revolutions number which will not damage the bearing or a lower revolutions number in which the adhesive agent does not scatter with the centrifugal force is set, and a checking operation is executed with the lower revolutions number thus set. To state more concretely, if the revolutions number N1 is equal to or less than 10,000 rpm and the specific gravity of the adhesive agent is two or more times of the specific gravity of aluminum alloy, the above-mentioned troublesome matters as mentioned above do not occur. The above fact has been practically confirmed by experiments.

When the balance correction falls in the tolerable area (20 mg•mm or less), firmly-fixing of the applied adhesive agent is performed. In the case of using an ultraviolet-hardening type adhesive, the ultraviolet light rays are radiated in order to firmly attach the adhesive agent. In the case of using a high-temperature-hardening type adhesive, the adhesive agent is hardened at a predetermined desired temperature, and then the operation advances to the second balancing process.

The balance check 25 in a second balance process is then performed with the revolutions number N2 higher than the revolutions number N1 of the balance check in the first balance process (S25).

In the rotation drive method, the constant-speed rotation by a PLL control is the same as that of the first balance check 23. At this time, for the PLL control, the constants in the circuit are respectively set such that the synchronous rotation can be done in either one of N1, N2, and actual usage revolutions number.

When the revolutions number is 30,000 rpm or more at the time of deflecting the laser in actual usage, even though the balance correction is done at 10,000 rpm, the bearing rigidity of the dynamic pressure bearing varies depending on the difference between the revolutions numbers. Consequently, the vibration becomes large and the influence exerted on the balance of the rotatable body 11 due to the increase of the centrifugal force may become a problem to be solved.

Here, the balance is corrected with the revolutions number at the time of deflecting the laser actual usage, and thereby the above-mentioned problems can be solved. In practice, if the revolutions number is ½ or more of the actually-used revolutions number, the influence due to the variation of the dynamic pressure bearing rigidity is very small. Therefore, there arises no problem practically. If the result of checking in step 25 falls outside of the tolerable value, the balance correction is executed (S26). The method is executed by the correcting method of removing (e.g., scraping off).

That is, the removing operation is executed by scraping off one of the construction parts of the rotatable body 11. It may be most suitable to scrape off the polygon mirror 23 and the rotor flange 24. The reason for that is that the upper-edge and lower-edge parts of the rotatable body are employed and the so-called two surfaces correction can be easily done, and further since the material is aluminum alloy, the fine adjustment at the time of scraping off is easy. Because of the superior scraping-off property, the mechanical processing can be done easily by use of the small-size drilling machine of φ1 mm or less.

Moreover, a scraping-off method by laser radiation in addition to another scraping-off method by use of a drilling machine may be preferable. In the case of the laser radiation scraping-off method, it is not necessary to remove the scraped-off residue occurring at the time of scraping-off.

The rotatable body 11 corrected to the extent of 20 mg•mm or less at the above-mentioned first balance processing is further corrected to the extent of 2 mg•mm or less at the second balance processing.

Moreover, in the case of the high-speed rotation of the balance check in the step S25, the wind loss of the rotatable body 11 increases. Therefore, it may be desirable to practically mount the upper cover 18 in order to decrease the wind loss. It may be also desirable to make the shape of the upper cover 18 the same as that of the polygon mirror 23 circumference at the time of actually deflecting the laser.

If the upper cover 18 does not exist, the electric current increases, namely, the magnetic force of the motor increases, by the action of the wind loss, and thereby the movement of the rotatable body 11 in the axis shaft direction is changed. As a result, the movement change exerts an influence on the value at the time of checking the balance. Furthermore, there arises a fear that damage from hitting the polygon mirror surface occurs when the dirt floating in the circumference of the polygon mirror 23 impinges upon the surface of the polygon mirror to exert a bad influence on the polygon mirror. Namely, the above hitting damage deteriorates the reflection coefficient factor of the polygon mirror.

At this time, an entire portion or a part of the upper cover 18 is formed by a light-transmitting member, and thereby the non-contact type optical sensor can be adopted preferably in order to detect the revolutions number of the rotatable body 11 needed at the time of checking the balance.

On the other hand, there exists another method of detecting the reference signal of the revolutions number from the drive circuit. However, in such a structure, it is necessary to provide checking pins, etc. on the circuit base board, and therefore the assembling cost of the apparatus rises up inevitably in the case of employing the circuit of the polygon scanner 10 itself. Furthermore, the method of electric connection turns out to be complicated.

Moreover, the aforementioned embodiment shows two processings in the checking process. However, it is not limited to those two processings. In order to attain further high-speed/low-vibration, it may be allowable to add a third process, a fourth process, etc., subsequently to the second process. In such a situation, it may be desirable to sequentially increase the revolutions number at the time of balance checking to a higher value after each balance checking operation. The detection accuracy at the time of checking is improved by the further high-speed rotation.

The preferable state and the unpreferable state of the unbalance amount and the revolutions number of checking in the balance process as explained heretofore are respectively illustrated in FIG. 4. The actual operation revolutions number is as an example at 50,000 rpm. The marks "@" and "O" represent preferable check revolutions numbers. In particular, the mark "@" represents a most preferable example. To show bad examples, the mark "X" in the first process represents the area in which damage of the bearing occurs due to the high-speed rotation, and the mark "X" in the second process represents another area in which the revolutions number turns out to be ½ or less of the actual operation revolutions number, the difference between the actual operation revolutions number and the check revolution number becomes large, and therefore the influence exerted on the vibration due to the difference of the bearing rigidity is not negligible. Consequently, both of those examples are not preferable.

In such a way, according to the present embodiment, when the balance of the rotatable body rotatively supported on the dynamic pressure bearing is corrected, the method of applying the adhesive agent and the other method of removing a part of the rotatable body are jointly employed, and thereby the balance correction of high precision can be simply attained from a large initial unbalance amount to a very fine unbalance amount. For the large initial unbalance, the rough correction can be executed by applying the adhesive agent. For the small unbalance, the fine correction can be executed by removing (e.g., scraping off) a part of the rotatable body.

Furthermore, at the time of checking the balance, plural checking processes of different revolutions number are provided. In those processes, the revolutions number of the second balance correcting process is set to a value higher than that of the first balance correcting process. As a result, damage of the bearing can be reduced even for a large initial unbalance amount. Furthermore, the influence exerted on the balance of the rotatable body, due to the increase of the vibration by the variation of the bearing rigidity caused by the difference of the revolutions number, or due to the increase of the centrifugal force, can be largely decreased.

The correction of the first balance correcting process is executed by applying the adhesive agent, while the correction of the second balance correcting process is executed by removing (e.g., scraping off) a part of the rotatable body. In the first balance correcting process, the working of the process can be executed for a short time with a smaller volume than the volume of a removed (e.g., scraped off) part of the polygon mirror made of usually-used aluminum alloy in order to correct a large initial unbalance amount. In addition, in the second balance correcting process of small correction amount, since aluminum alloy of a small specific gravity is scraped off, the fine correction can be done easily.

Furthermore, since aluminum alloy is non-magnetic, it is possible to prevent the scraping-off dirt occurring at the time of removing a part of the rotatable body from being attached again to the rotatable body by action of magnetic force.

Furthermore, when the balance check is performed in the balance correcting process, the upper cover is provided so as to surround the outer circumference of the polygon mirror, and thereby the wind loss can be reduced at the time of the high-speed rotation and the influence exerted on the value at the time of checking the balance due to the movement variation in the axis direction can be reduced. Furthermore, damage on the mirror surface by hitting occurring at the time of the impingement of the dirt floating in the circumference of the polygon mirror upon the surface of the polygon mirror can be eliminated. Thereby, the deterioration of the reflection coefficient can be prevented.

Furthermore, all of or a part of the upper cover surrounding the polygon mirror may be constructed with a light-transmitting member, the light is directed to the rotatable body as incident light, and the revolutions number of the rotatable body is detected. In such a structure, the revolutions number can be detected in the non-contact state, and thereby the revolutions number detection can be easily performed.

Furthermore, at the time of checking the balance, at least the rotatable body, the bearing, and the motor are constructed in the same as an actual usage state, and the drive control circuit is controlled so as to obtain a constant-speed rotation with the same control circuit constant as the constant in the actual usage state. Thereby, since the specially-used circuit base board is not provided at the time of rotating the motor for the balance correction, the process can be simplified. In addition, the bearing for the actual usage can be used, and the influence exerted on the balance correction due to the difference of the bearing rigidity caused by the unevenness of the bearing diameter can be eliminated.

Furthermore, the rotative attitude at the time of the balance check for the balance correction is adjusted to the same as the actual usage state. Thereby, the variation. i.e., balance change, of the dynamic pressure bearing rigidity at the respective attitudes is eliminated. Consequently, the balance correction can be executed with high accuracy.

According to the present invention mentioned heretofore, in the method of correcting the balance for a high-speed rotatable body, when a rotatable body is rotatably supported by a dynamic pressure bearing and the balance of the rotatable body is corrected, and a step of applying adhesive agent to the rotatable body and another step of removing a part of said rotatable body are jointly employed.

In the state of a large initial unbalance, a rough correction is executed by applying the adhesive agent, and finally a fine correction is executed by removing a part of the rotatable body by scraping-off. Consequently, high-accuracy balance correction can be easily attained for every unbalance amount from a large initial unbalance amount to a fine unbalance amount.

Furthermore, if plural checking processes are established for different revolutions numbers and the revolutions number in a subsequent process is set to a higher value than that in a preceding process, the extent of damage of the bearing can be reduced even for a large initial unbalance amount. In addition, the influence exerted on the balance of the rotatable body due to growth of the vibration by the variation of the bearing rigidity caused by the difference of the revolutions number or due to the increase of the centrifugal force can be reduced. Consequently, the accuracy of the balance correction can be improved.

Furthermore, if correction in a preceding process is performed by the method of applying the adhesive agent and correction in a subsequent process is performed by the method of removing a part of the rotatable body, the rough correction can be executed in the preceding process with the low revolutions number, while the fine correction can be executed in the subsequent process with the high revolutions number.

Furthermore, if the balance correction is performed by removing a non-magnetic member which is superior in the scraping-off property from the rotatable body construction parts, the fine correction can be easily preferred. In addition, the scraping-off dirt or dust occurring at the time of scraping off the part of the rotatable body can be prevented from being attached again to the rotatable body. Consequently, the easiness of working can be improved and the accuracy of correcting the balance can also be improved.

Furthermore, if the specific gravity of the adhesive agent is larger than that of the member to be removed, the works can be done for a short time with small volume. Consequently, the easiness of working can be improved and the accuracy of correcting the balance can also be improved.

Furthermore, if a cover member is provided so as to surround the outer circumference of the rotatable body, the wind loss can be reduced at the time of the high-speed rotation. In addition, the influence exerted on the value, i.e., unbalance value, at the time of the balance check due to the change of the movement in the shaft direction can also be reduced. Consequently, the hitting damage on the surface of the polygon mirror occurring when the dirt or dust floating in the circumference of the polygon mirror collides against the polygon mirror can be eliminated, and thereby the deterioration of the reflection coefficient factor can be prevented, and the accuracy of the balance correction can be improved.

Furthermore, if all of or a part of the cover member is constructed with a light transmitting member, the light is directed onto the rotatable body as the incident light through the light transmitting part and the revolutions number of the rotatable body is detected thereon, and the revolutions number can be detected in the non-contact state. Consequently, the revolutions number can be detected easily and the accuracy of the balance correction can be improved.

Furthermore, if at least the rotatable body, the bearing, and the motor is constructed with the same structure as that in actual usage conditions and the drive control circuit performs the constant-speed rotation control with the same control circuit constant as that in actual use, a specialized circuit base board need not be provided at the time of the rotation in order to correct the balance. In addition, the working process can be simplified and the influence exerted on the balance correction due to the difference of the bearing rigidity caused by the unevenness of the bearing diameter can be eliminated. Consequently, the accuracy of the balance correction can be improved.

Furthermore, if the balance check is done with the same rotation attitude as that in actual usage, the variation balance change of the dynamic pressure bearing rigidity can be eliminated. Consequently, the accuracy of the balance correction can be improved.

A further embodiment of the dynamic pressure bearing and the optical scanning apparatus by use of the above bearing according to the present invention is described in detail hereinafter referring to the accompanying drawings.

Figure 5:
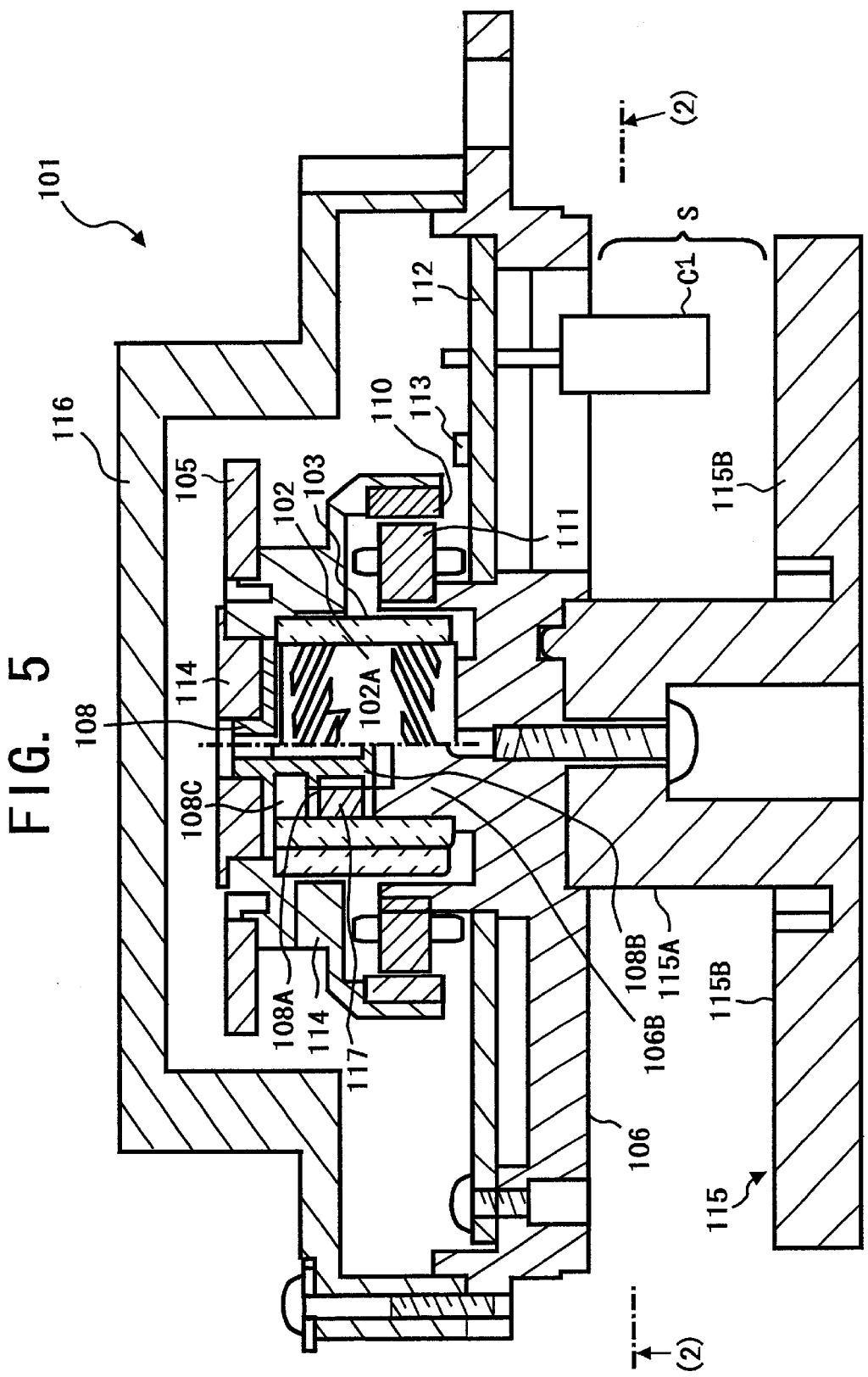
FIG. 5 is a cross-sectional view illustrating a structure of a polygon scanner bearing of a further embodiment according to the present invention.

FIG. 5 is a cross-sectional view for illustrating a structure of the polygon scanner which is an example of the optical scanning apparatus employing the dynamic pressure bearing according to the second embodiment of the present invention. In FIG. 5, one-side part of the rotatable sleeve mentioned later is represented as an internal cross-section from the border line of the axis center shown by a dot-and-dash line.

In FIG. 5, the polygon scanner 101 is provided with a rotatable body composed of a rotatable sleeve 103 serving as a rotatable shaft fitted to the fixing shaft 102 and a flange member 104 unitarily and firmly fixed on the rotative sleeve 103, and a rotatable polygon mirror 105 made of a high-purity aluminum member unitarily and firmly fixed on the flange member 104.

The fixing shaft 102 is a member for constructing the dynamic pressure bearing in the radial direction and may be made of ceramics material, and fitted to and firmly fix on the outer circumferential surface of a projecting receptacle portion 106B formed on the support housing 106 having a connection hole 106A for connecting the support housing 106 to the housing unit of the light writing-in apparatus (not shown in FIG. 5). A plurality of herringbone dynamic pressure generating grooves 102A are formed along the circumferential direction thereof.

The rotatable sleeve 103 is a cylinder-shaped member made of ceramics fittedly inserted to oppose the outer circumferential surface of the fixing shaft 102 with a gap of several μm therebetween. In the inner surface thereof, a magnet 117 is fixed as shown at the left side of the dot-and-dash line in FIG. 5.

The magnet 117 forms a magnetic bearing for supporting the rotatable sleeve 103 in a floating state in the axis direction in the non-contact state with the rotatable sleeve 103, utilizing the magnetic force generated between the rotatable sleeve 103 and the magnetic body 108 disposed on the projecting receipt portion 106B of the support housing 106.

The magnetic body 108 is a metal member composed of a cylindrical member having a bottom surface. Magnetic pieces 108A and 108B are respectively formed in the vicinity areas of the upper and lower surfaces of the magnet 109. The gap between those magnetic pieces 108A and 108B and the magnet 117 can be kept in the non-contact state as a magnetic gap.

A gap portion is formed above the magnetic piece 108A at the upper side of the magnetic body 108. The gap portion serves as an air-staying portion 108C. The air-staying portion 108C communicates with the bottom portion of the magnetic body 108 through the magnetic gap between the magnet 117. The air-staying portion 108C further communicates with the internal space of the magnetic body 108 and the exterior thereof through a fine hole formed on the bottom portion.

Such air-communicating structures enable the communication of air with the exterior of the air-staying portion 108C. The structure forms a so-called air damper portion. For this reason, when the external force is exerted on the rotatable sleeve 103 due to the external disturbance so as to shift it in the axis direction thereof, since the communication of the air between the air-staying portion 108C and the exterior thereof occurs in the internal space of the magnetic body 108, the floating state is kept by the action of the magnetic force between the magnet 117 and the magnetic pieces 108A and 108B, and thereby it is possible to prevent the shifting of the rotatable sleeve 103 in the axis direction thereof owing to the change of the internal air pressure.

The flange member 104 is unitarily formed on the outer circumferential surface of the rotatable sleeve 103. The flange member 104 is a die casting member or a press-processing member both employing aluminum alloy, and the member 104 is unitarily formed with the rotatable sleeve 103 utilizing the method of shrinkage fitting or ordinary fitting.

The rotatable polygon mirror 105 constructed with an aluminum member of high purity of 99.9% or more is unitarily formed on the outer circumferential surface of the flange member 104.

The rotatable polygon mirror 105 is formed in a state of a flat plate. The center portion thereof is unitarily formed with the flange member 104 by shrinkage fitting or ordinary fitting. The mirror processing is practiced on the outer diameter portion which is positioned on the surface of the rotatable sleeve 103 as the standard surface. The inner diameter of the rotatable sleeve 103 or the right-angled degree thereof is previously set for the above-mentioned inner diameter. By practicing such mirror processing, the reflection surface serving as the deflection surface can be formed.

A rotor-side magnet 110 employing a permanent magnet is provided on the inner circumferential surface at the lower part side of the flange member 104 which is a rotor side unitarily formed on the rotatable sleeve 103. On the other hand, a stator-side coil 111 is provided at the side of the support housing 106 opposing the rotor-side magnet 110. The outer-rotor type motor is constructed with the arrangement structure of the rotor-side magnet 110 and the stator-side coil 111.

In such an outer-rotor type motor, as in the case of motor rotation control, the position of the magnetic pole of the rotor-side magnet 110 and the control of changing over the magnetic exciting current are supplied to the stator-side coil 111. Thereby, a continuous rotation can be continued. For this reason, a Hall element 113 capable of detecting the magnetic pole of the rotor-side magnet 110 is positioned and disposed in the vicinity of the rotor-side magnet 110, on the circuit base board 112 insertedly mounted on the projecting receipt portion 106B of the support housing 106.

A cover-shaped closing member 114 made of aluminum alloy is fittedly fixed on the upper end surface of the magnetic body 108. The closing member 114 is situated on the coaxial axis of the rotatable sleeve 103 shaft. The outer diameter and mass of the closing member 114 are determined such that both of them are smaller than the rotating moment of the rotatable sleeve 103. In particular, the diameter of the closing member 114 is formed so as to be smaller than that of the rotatable sleeve 103. Thereby, the rotating moment is limited so as not to become large.

Since the closing member 114 prevents the slipping-out of the rotatable sleeve 103 and serves as the inertia mass body rotating on the rotation center position, it may be possible to prevent the occurrence of unstable rotation balance of the rotatable sleeve 103 caused by some external disturbance. By adopting the shape of making the rotating moment of the closing member 114 smaller than that of the rotatable sleeve 103, the load increase at the time of starting the rotation is prevented, and thereby the rising-up of the rotation can be improved. In such a way, the countermeasure against the external disturbance can be practiced.

The rotatable sleeve 103, the flange member 104, and the rotatable polygon mirror 105 which is a high-purity aluminum member are respectively made in accordance with the following procedures (1)–(5).

(1) The rotatable polygon mirror 105 in the state before mirror-surface processing is firmly fixed on the outer circumferential surface of the flange member 104, by use of the method of shrinkage fitting.

(2) The flange member 104 to which the rotatable polygon mirror 105 is firmly fixed is fixed on the outer circumferential surface of the rotatable sleeve 103 by the method of shrinkage fitting. Thereafter, a finishing process is practiced for the inner diameter portion i.e., inner wall, of the rotatable sleeve 103 with accuracy to the extent that the gap of the dynamic pressure bearing can be formed between the inner wall of the rotatable sleeve 103 and the fixed shaft 102.

(3) The rotor-side magnet 110 is firmly fixed on the necessary portion of the flange member 104 by an ordinary fitting or shrinkage fitting.

(4) The stator coil 111 and the closing member 114 are respectively firmly fixed to the necessary portion by an ordinary fitting or shrinkage fitting.

(5) The mirror-surface processing is practiced for the rotatable polygon mirror.

On this occasion, since the rotatable polygon mirror 105 is a flat plate firmly fixed to the flange member 104, and the flange member 104 is unitarily formed with the rotatable sleeve 103, the mirror-surface processing is practiced on the outer diameter portion positioned on the standard end surface of the rotatable sleeve 103, and thereby the reflection surface is formed as the deflection surface.

The rotatable polygon mirror 105 is formed such that the outer diameter thereof is larger than that of the flange member 104. Thereby, at the time of practicing the mirror processing on the outer-diameter portion, the processing tool does not contact other members. For this reason, since the mirror surface processing can be performed after firmly fixing the rotatable sleeve 103 and the rotor-side magnet 110, it may be possible to avoid unnecessary contact with the mirror surface as in the case of assembling the other members after processing the mirror surface.

The rotatable sleeve 103 may be constructed with ceramics having a thermal expansion coefficient of $0.7 \times 10^{-5}/°C$. and having a preferable property of friction-proofness required as the bearing. The flange member 104 is made of aluminum alloy. Since the flange member 104 and the rotatable polygon mirror 105 are constructed with the same material, the thermal expansion coefficients of both elements are equal $2.3 \times 10^{-5}/°C$. For this reason, when the temperature rises up at the time of the rotation, there is no difference between the thermal expansion coefficients of ceramics and aluminum, for instance, at the high-speed rotation of 30,000 rpm or more which is the operational usage rotation of the polygon scanner, and at which the temperature increase due to the heat-radiation turns out to be 80° C. or more. In consideration of the above fact, at the junction part of the shrinkage fitting portion, the shrinkage fitting margin is established so as to keep the joining force even at that high temperature.

A heat emitting member 115 is provided at a part of the support housing 106. The heat emitting member 115 is a member having a T-shaped cross-section provided with a projecting support pillar portion 115A capable of projecting onto the lower-surface center portion of the support housing 106 and the heat radiating surface 115B elongated to the side portion from the lower surface of the projecting support pillar portion 115A. The heat emitting member 115 is unitarily joined with the support housing 106. A large number of projecting portions or groove portions corresponding to the heat radiating fin are formed on the heat radiating surface 115B of the heat emitting member 15 in order to secure the head radiating square measure.

The heat radiating surface 115B of the heat emitting member 15 is opposed to the circuit base board 112, and creates an opposed space. The distance of the gap portion is set such that the distance therebetween turns out to be the accommodation space S for accommodating the circuit base board for practically mounting thereon the circuit elements, for instance, control circuit elements for driving the motor such as capacitors represented by the symbol C1.

Thereby, the circuit elements practically mounted on the circuit base board 112 are surrounded by the circuit base board 112 and the heat radiating surface 115B. When the assembled parts are mounted in the housing of the polygon scanner after unitarily mounting the heat emitting member 115 on the support housing, it is possible to safely guard the circuit element so as not to carelessly touch the elements with someone's fingers.

Figure 6:
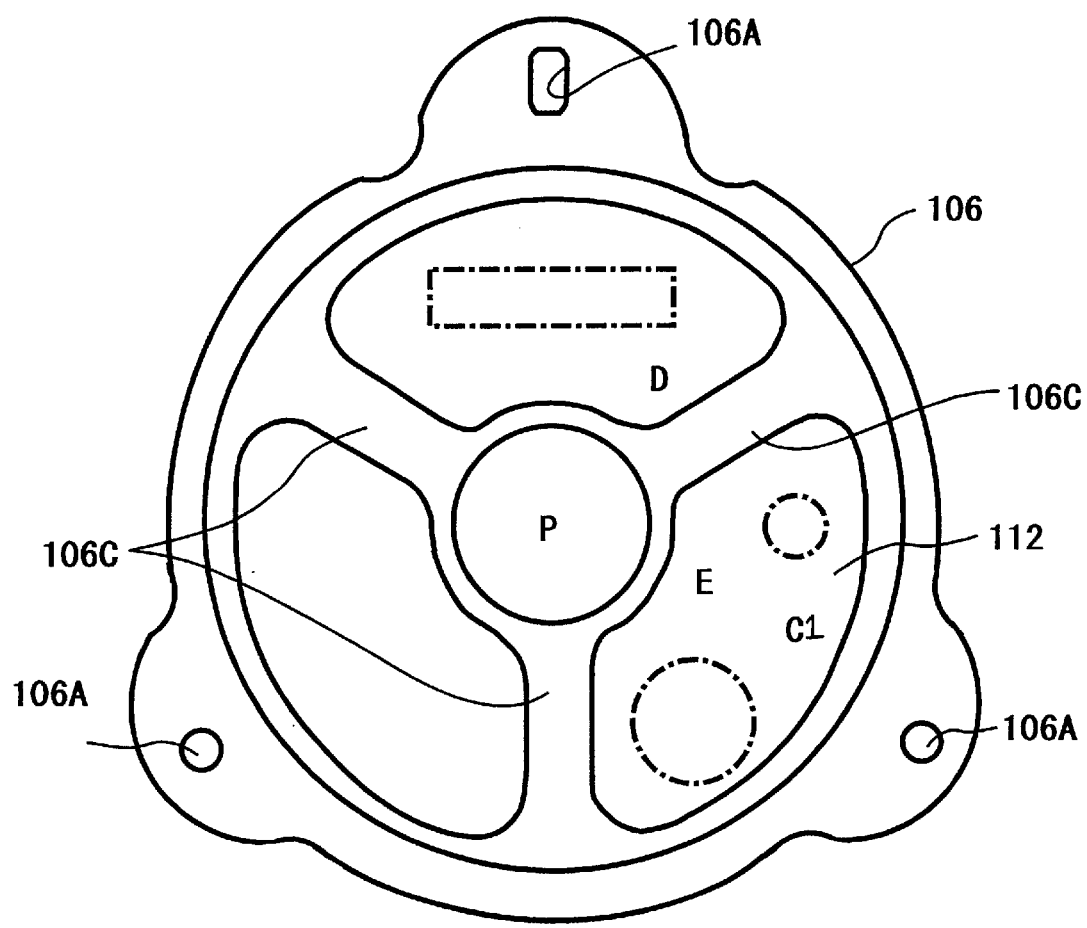
FIG. 6 is a cross-sectional view taken along the line (2)—(2) shown by arrows in FIG. 5.

The connection holes 106A provided on the support housing 106 are respectively arranged at equally-divided angle positions around the standard center position on which the heat radiating member 115 is unitarily formed, as shown in FIG. 6 which is a cross-sectional view taken along the line in FIG. 5 shown by arrows (2),(2), and levers 106C are respectively provided between the connection holes 106A themselves.

The respective levers 106C are provided such that the base portion is situated on the base portion of the support housing 106 (in FIG. 6 the position shown by the symbol P) and one end portion of the levers 106C is extended in the circumferential direction from the center of the base portion to the intermediate position between the positions where the connection holes 106A are respectively formed. In other words, the levers 106C are respectively provided on the positions excluding the positions on the lines connecting the connection holes 106A and the center position of the support housing 106.

In such a support housing 106, the vibration occurring on the base portion P is not transferred in the state of directly advancing straightly to the connection holes 106A. For this reason, the vibration generated by the rotatable sleeve 103, etc. on the base portion P arrives at the outer circumferential portion through the position of the lever 106C. Next, the vibration arrives at the connection hole 106A. Consequently, the propagation path of the vibration becomes long, and thereby the attenuation of the vibration in the propagation path can result.

In FIG. 6, the reference symbols C1, D, and E represent the circuit elements practically mounted on the circuit base board unitarily supported by the support housing 106. The circuit element shown by the symbol C1 in FIG. 6 corresponds to the capacitor C1 shown in FIG. 5.

Figure 7A:
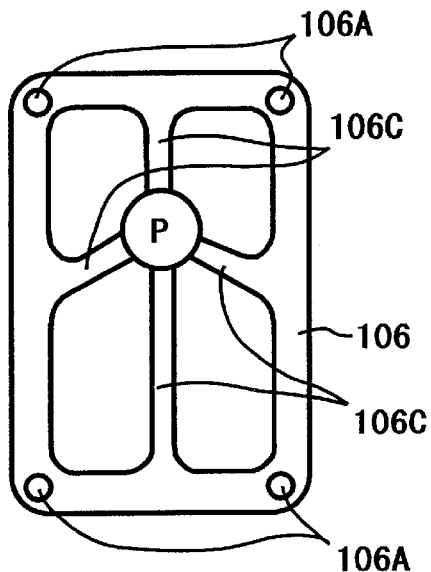
FIGS. 7A through 7D are explanatory diagrams for respectively explaining modifications of the support housing shown in FIG. 6.
Figure 7B:
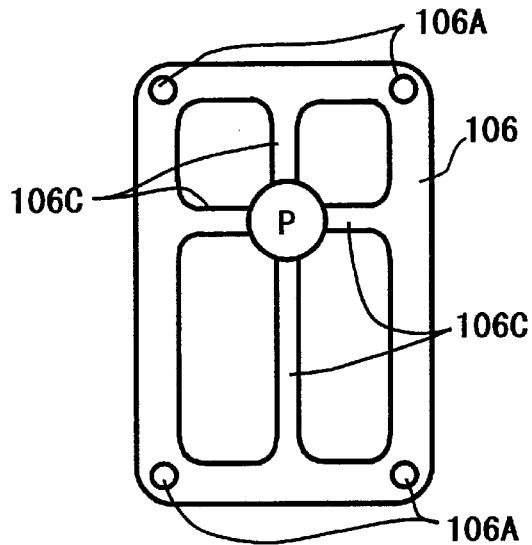
Figure 7C:
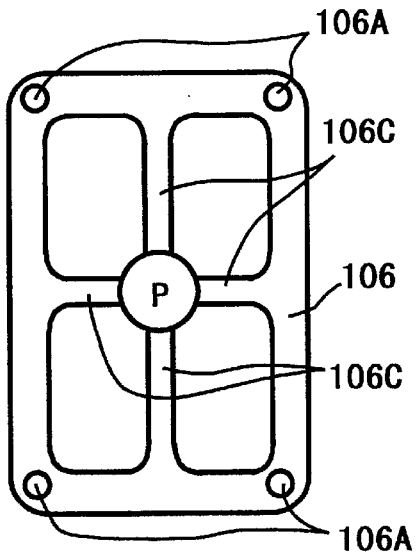

As to the state of installing the levers 106C, the levers can be installed in accordance with the state of installing the support housing 106. FIG. 7A through 7B are cross-sectional views illustrating the state of some modifications of the support housing 106. The support housings 106 respectively shown in FIGS. 7A through 7C are formed in the rectangular shape instead of the circular shape. In the case of such a rectangular support housing, when connection holes 106A are formed at the respective angular edge portions, the levers 106C are extended toward the intermediate portion between the positions on which the connection holes 106A are formed on the positions excluding the position on the lines connecting the connection holes 106A and the base portion of the support housing 106 (for convenience shown by "P").

Figure 7D:
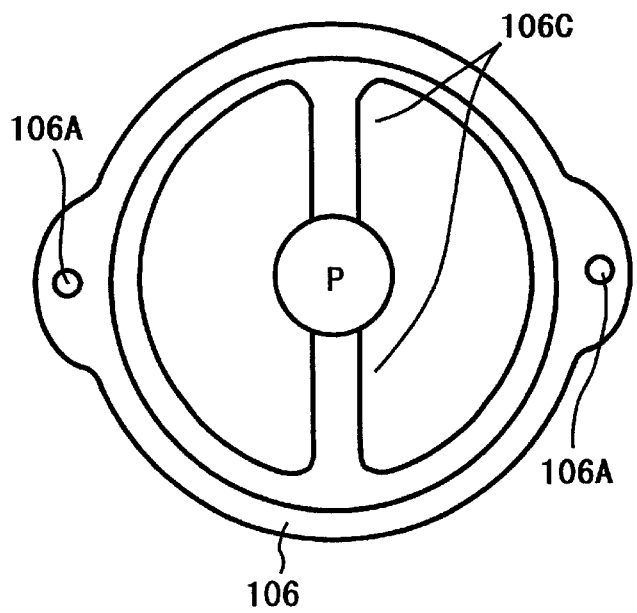

Furthermore, the support housing 106 shown in FIG. 7D has a structure in which two connection holes 106A are formed on two symmetrical places opposing each other from the base portion P of the support housing 106. On this occasion, the levers 106C are extended toward the intermediate position between the positions on which the connection holes 106A are respectively formed with the phase difference of 90° between the levers 106C and the connection holes 106A (perpendicularly to the line connecting both of the connection holes 106A).

The present embodiment adopts the structure as mentioned above, namely, the dynamic pressure bearing is made such that the rotatable polygon mirror 105 is unitarily combined in accordance with the above-mentioned procedure.

Since the flange member 104 fittedly inserted in the rotational sleeve 103 is made of a substance with a thermal expansion coefficient equal to that of the rotatable polygon mirror 105 constructed with the high-purity aluminum portion, thermal stress does not occur at all between the flange member 104 and the rotatable polygon mirror 105. For this reason, even in a case that a temperature rising-up occurs at a time of rotating the rotatable sleeve 103, any looseness does not occur at all in the fitting portion between the flange member 104 and the rotatable polygon mirror 105. Thereby, the reflection surface of the rotatable polygon mirror can keep the state formed on the standard of the inner wall or the end surface of the rotatable sleeve 103. Consequently, the deflecting function is not damaged at all.

In the polygon scanner 101 in which the dynamic pressure bearing is unitarily assembled together with the rotatable sleeve 103, a dust-tight cover 116 is installed in the state of covering the upper surface of the support housing 106. The polygon scanner 101 is mounted on the optical writing-in apparatus (not shown in FIG. 7) through the connection holes 106A of the support housing 106. The window made of glass (not shown in FIG. 7) is installed on the dustproof cover 116 in order to transmit therethrough the laser beam from the rotatable polygon mirror 105.

According to the present embodiment, since the rotatable polygon mirror 105 is formed in the shape of a flat plate, it is possible to construct the rotatable polygon mirror 105 by a simple press processing. In addition, by employing high-purity aluminum, the cost of the employed material can be largely reduced. Consequently, the increase of the processing cost can be prevented.

The above-mentioned flange member 104 has an integral structure in which the rotatable polygon mirror 105 is unitarily combined to the receiving surface by shrinkage fitting or ordinary fitting. However, the present invention is not limited to the above-mentioned structure.

Figure 8:
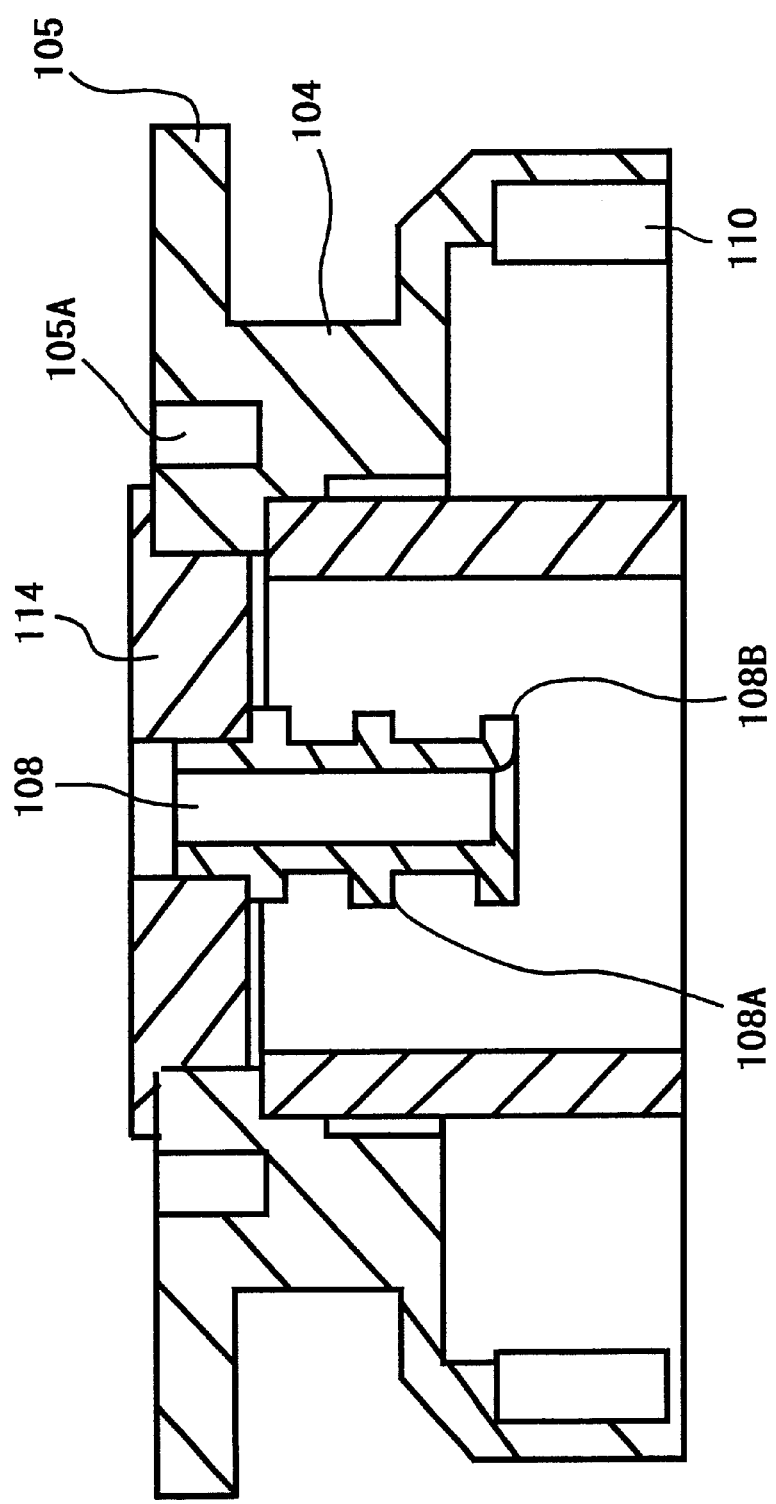
FIG. 8 is a cross-sectional view for illustrating a modification of a structure of a flange member and a high-purity aluminum part both employed for the dynamic pressure bearing shown in FIG. 5.

FIG. 8 is a cross-sectional view for illustrating a modification of the structure of the flange member and the high-purity aluminum part both employed for the dynamic pressure bearing shown in FIG. 5. In FIG. 8, the structure of the flange member 104 is integrally formed with the rotatable polygon mirror made of high-purity aluminum.

A groove 105A deeper than the thickness of the rotatable polygon mirror 105 is formed on the flange member 104 shown in FIG. 8 at the part where the basic part of the rotatable polygon mirror 105 is situated. The groove 105A is provided as a part capable of intercepting the transmission of thermal stress caused by the difference of the thermal expansion coefficient due to the difference between the material of the groove 105A and that of the rotatable sleeve 103, and thereby preventing the transmission of the thermal stress to the rotatable polygon mirror 105.

In such a structure, since it is possible that the influence of the thermal stress at the side of the rotatable sleeve 103 is not exerted on the rotatable polygon mirror, the occurrence of the distortion on the reflection surface of the rotatable polygon mirror 105 can be prevented and the lowering of the surface accuracy changing the direction of the reflection surface can be also prevented. Consequently, a proper deflecting function can be kept. In this connection, if the depth of the groove 105A is smaller than the thickness of the rotatable polygon mirror 105, the thermal stress caused by the difference of the thermal expansion coefficient is directly transmitted inevitably to the rotatable polygon mirror 105. Consequently, the surface accuracy turns out to be deteriorated.

In such a structure as mentioned heretofore, the process as mentioned in the procedure (1) can be omitted as in the case of the flange member 104 shown in FIG. 5, and thereby the number of the employed parts and the number of the processing procedures can both be reduced.

In addition, since the groove 105A is provided at the side of the base portion side of the rotatable polygon mirror 105, contrary to the case of providing the groove on the flange portion 104, the influence of thermal stress caused by thermal expansion likely to occur on the rotatable polygon mirror 105 can be interrupted by the rotatable polygon mirror 105 itself. Consequently, distortion and the surface falling-down can be reduced and thereby a proper deflecting function can be maintained.

As to the dynamic pressure bearing and the optical scanning apparatus utilizing the dynamic pressure bearing, according to the present invention, since the sleeve serving as the rotatable shaft is made of ceramics not apt to be thermally deformed and the flange member which is shrinkage-fitted to the sleeve is provided with a high-purity aluminum part and the closing member both having a same thermal expansion coefficient as that of the sleeve, there occurs no difference in the thermal expansion coefficients between the members mounted on the flange members, and therefore loosening of the fitting portion caused by thermal expansion coefficient differences does not occur. Thereby, since the members themselves integrally combined on the flange member do not loosen the combining state therebetween, the deterioration of the rotation balance can be prevented.

Since the high-purity aluminum part has a flat plate integrally provided on the flange and the outer diameter portion is processed with a finishing treatment on the standard of the inner diameter or the end surface of the sleeve, the outer diameter of which is prevented from the deterioration of the rotation balance, the used high-purity aluminum on the rotating part can be decreased. In addition, the finishing process of the outer diameter portion can be executed precisely even by a simple mechanical processing. Consequently, any increase of mechanical processing costs can be suppressed.

According to the present invention, since the closing member having the same thermal expansion coefficient as that of the high-purity aluminum part is provided on the coaxial line of the rotatable sleeve, the high-purity aluminum part and the closing member, and the combination thereof can be employed as the inertia mass body. Consequently, the occurrence of the unevenness of the rotation (revolutions number) of the high-purity aluminum part can be suppressed and the rotation of the rotatable part at the dynamic bearing can be kept stable.

According to the present invention, since a ventilation hole communicating with the exterior is provided at the magnetic force generating part employing a magnet for supporting the rotatable shaft in the axial direction in the floating state from the fixed shaft, an air damper can be constructed through the ventilation part. In such a structure, when the sleeve moves unstably in the shaft direction, the air contained in the interior can be effectively communicated with the exterior, and thereby the unstable movement thereof can be attenuated promptly. Consequently, it is possible to keep the floating state created only by the magnetic force and hold the rotative position of the high-purity aluminum part at a predetermined position.

According to the present invention the flange member and the high-purity aluminum part are integrally and unitarily formed. Thereby, the works of processing can be facilitated. In addition, the transmission of thermal stress due to thermal expansion coefficient differences between the sleeve and the high-purity aluminum part can be intercepted by a groove. Consequently, the deterioration of the positional accuracy of the outer diameter portion of the high-purity aluminum part can be prevented.

According to the present invention, since a part of the housing serves as a heat radiator including a space for mounting the circuit elements between the rotation drive circuit base board and the housing, the remaining space can be effectively utilized and temperature rising-up of the dynamic pressure bearing can be suppressed. Consequently, the undesirable occurrence of the thermal stress due to the unexpected thermal expansion between the construction members can be prevented, and the occurrence of the rotation unevenness is suppressed considerably.

According to the present invention, since the end portions of the lever are situated between the positions where the mounting holes are formed respectively, the direct transmission of vibration from the sleeve fittedly inserted through the fixed shaft can be considerably suppressed. Consequently, attenuation efficiency of the vibration in the vibration transmitting path can be raised and the vibration transmitting coefficient to the optical housing can be reduced, and thereby the noise and the deterioration of the image quality caused by the vibration can be prevented.

According to the present invention, if the high-purity aluminum part is employed as the rotatable polygon mirror, the occurrence of the distortion due to the thermal stress on the reflection surface of the rotatable polygon mirror can be prevented, and the high-accuracy deflecting function and the light scanning apparatus with highly suppressed vibration can be obtained.

The preferred embodiments of the present invention have been described heretofore. However, numeral additional modification and variations of the present invention are possible in light of the above teachings. It is therefore to be understood that within the scope of the appended claims, the present invention may be practice otherwise than as specifically described herein.

This document claims benefit of priority under 35 U.S.C. §120 to Japanese Patent Application Nos. 11-224585, 11-308144, and 2000-002539, respectively filed in the Japanese Patent Office on Aug. 6, 1999, Oct. 29, 1999, and Jan. 11, 2000, the entire contents of each of which are hereby incorporated herein by reference.

What is claimed as new and is desired to be secured by Letters Patent of United States:

1. A method of correcting balance for a high-speed rotatable body comprising the steps of:
   rotatably supporting a rotatable body by a dynamic pressure bearing; and
   correcting a balance of the rotatable body;
   wherein, said step of correcting the balance for the rotatable body comprises the substeps of:
   (a) applying adhesive agent to the rotatable body;
   (b) increasing a revolution number of the rotatable body after applying the adhesive agent; and
   (c) removing a part of the rotatable body when the rotatable body is rotated at the increased revolution number.

2. A method of correcting balance for a high-speed rotatable body rotatably supported by a dynamic pressure, comprising the steps of:
   executing plural checking processes to check a balance of the rotatable body with different revolution numbers;
   correcting a balance of the rotatable body after each of the plural checking processes; and wherein the revolution number of the rotatable body in each subsequent plural checking process is set to a value higher than the revolution number of the rotatable body in a preceding plural checking process and a balance weight is fixed with an adhesive agent in said each subsequent plural checking process.

3. A method of correcting balance for a high-speed rotatable body as defined in claim 2, further comprising the step of correcting a balance of said rotatable body by removing a part of the rotatable body which is rotated at a speed of 30,000 rpm or higher.

4. A method of correcting the balance for a high-speed rotatable body as defined in claim 2,
wherein, during at least part of said step of correcting the balance, a cover member is provided to surround an outer circumference of the rotatable body.

5. A method of correcting the balance for a high-speed rotatable body as defined in claim 2,
wherein, during at least part of said step of correcting the balance, at least the rotatable body, a bearing, and a motor are operated in a same state as an actual usage state; and
wherein a drive controlling circuit is controlled with a same control circuit constant as the actual usage state so as to rotate the rotatable body with constant speed.

6. A method of correcting the balance for a high-speed rotatable body as defined in claim 2,
wherein, during at least part of said step of correcting the balance, the rotatable body is rotated at a same attitude as an actual usage attitude.

* * * * *